(12) United States Patent
Yabe et al.

(10) Patent No.: US 9,166,462 B2
(45) Date of Patent: Oct. 20, 2015

(54) ROTOR OF INDUCTION MOTOR, INDUCTION MOTOR, COMPRESSOR, AIR BLOWER, AND AIR CONDITIONER

(75) Inventors: Koji Yabe, Tokyo (JP); Hayato Yoshino, Tokyo (JP); Takahiro Tsutsumi, Tokyo (JP); Kazuhiko Baba, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 145 days.

(21) Appl. No.: 13/823,225

(22) PCT Filed: Oct. 19, 2010

(86) PCT No.: PCT/JP2010/068407
§ 371 (c)(1),
(2), (4) Date: Mar. 14, 2013

(87) PCT Pub. No.: WO2012/053064
PCT Pub. Date: Apr. 26, 2012

(65) Prior Publication Data
US 2013/0175896 A1    Jul. 11, 2013

(51) Int. Cl.
*H02K 17/16*    (2006.01)
*H02K 17/18*    (2006.01)
(Continued)

(52) U.S. Cl.
CPC .......... *H02K 17/165* (2013.01); *F04C 29/0085* (2013.01); *H02K 17/18* (2013.01); *H02K 17/185* (2013.01); *F04C 18/3564* (2013.01); *F04C 23/008* (2013.01); *H02K 2213/03* (2013.01)

(58) Field of Classification Search
CPC .... H02K 17/165; H02K 17/18; H02K 17/185
USPC .................................. 310/210–212, 156.78
See application file for complete search history.

(56) References Cited

U.S. PATENT DOCUMENTS 4,358,696 A * 11/1982 Liu et al. .................. 310/156.56
4,801,832 A    1/1989 Neumann
(Continued)

FOREIGN PATENT DOCUMENTS

JP    07-298582 A    11/1995
JP    09-224358 A    8/1997
(Continued)

OTHER PUBLICATIONS

JP Office action mailed on Nov. 12, 2013 for the corresponding JP application No. 2012-539503 (with partial English translation).
(Continued)

*Primary Examiner* — Dang Le
(74) *Attorney, Agent, or Firm* — Posz Law Group, PLC

(57) ABSTRACT

A rotor of an induction motor according to the present invention is a rotor including a squirrel-cage secondary conductor, wherein the rotor slot is constituted by an outer circumferential slot formed near an outer circumference of the rotor and an inner circumferential slot communicating with the outer circumferential slot and formed inside of the outer circumferential slot, a circumferential width TC of an innermost circumference of the outer circumferential slot is smaller than a circumferential width TD of an outermost circumference of the inner circumferential slot, and a circumferential width of the outer circumferential slot is smaller as the outer circumferential slot approaches to the outer circumference of the rotor.

10 Claims, 20 Drawing Sheets

(51) Int. Cl.
  *F04C 29/00* (2006.01)
  *F04C 18/356* (2006.01)
  *F04C 23/00* (2006.01)

(56) References Cited

U.S. PATENT DOCUMENTS

| | | | |
|---|---|---|---|
| RE34,667 E * | 7/1994 | Neumann | 310/216.069 |
| 5,498,918 A * | 3/1996 | Weihrauch | 310/216.013 |
| 6,362,552 B1 * | 3/2002 | Jeppesen | 310/216.004 |
| 6,874,221 B2 * | 4/2005 | Jansen et al. | 29/596 |
| 8,274,190 B2 * | 9/2012 | Alexander et al. | 310/211 |
| 2010/0253174 A1 | 10/2010 | Yabe et al. | |

FOREIGN PATENT DOCUMENTS

| | | |
|---|---|---|
| JP | 2000-014105 A | 1/2000 |
| WO | 2009/084251 A | 7/2009 |

OTHER PUBLICATIONS

International Search Report of the International Searching Authority mailed Dec. 7, 2010 for the corresponding international application No. PCT/JP2010/068407 (with English translation).

Office action mailed Dec. 3, 2014 for the corresponding CN application No. 201080069704.4 (with partial English translation).

Chinese Office Action mailed on Jul. 21, 2015 in the corresponding CN application No. 201080069704.4 (English translation attached).

* cited by examiner

ROTOR OF INDUCTION MOTOR, INDUCTION MOTOR, COMPRESSOR, AIR BLOWER, AND AIR CONDITIONER

CROSS REFERENCE TO RELATED APPLICATION

This application is a U.S. national stage application of PCT/JP2010/068407 filed on Oct. 19, 2010, the disclosure of which is incorporated herein by reference.

TECHNICAL FIELD

The present invention relates to a rotor of an induction motor, and particularly to a shape of a slot of a rotor of an induction motor. The present invention also relates to an inductor motor using the rotor of an induction motor, a compressor and an air blower each of which having the induction motor incorporated therein, and an air conditioner having the compressor and the air blower incorporated therein.

BACKGROUND

Conventionally, for a rotor of an induction motor, there have been proposed many shapes such as shapes of slots and shapes for reducing a power factor, a stray load loss, noise, and the like by providing slits on an outer circumference.

For example, a shape of a rotor is proposed as follows for a high-performance induction motor including a rotor iron core having a plurality of slots and a secondary conductor contained in these slots of the rotor iron core and formed by aluminum die casting. In this induction motor, slits that are not coupled to these slots are provided on a rotor surface side of enclosed slots of the rotor iron core, respectively, and each of these slits is set to have a circumferential dimension in a range from 1.0 millimeter to 3.5 millimeters and a radial dimension in a range from 1.0 millimeter to 2.5 millimeters so as to be able to always reduce its power factor, stray load loss, noise, and the like (see, for example, Patent Literature 1).

CITATION LIST

Patent Literature

Patent Literature 1: Japanese Patent Application Laid-open No. H9-224358

SUMMARY

However, the shape of the rotor of an induction motor described in Patent Literature 1 mentioned above has the following problems. That is, because the slits are provided in outer circumferences of the respective enclosed slots, an equivalent air gap widens and it is necessary to manage the air gap and to prevent shapes of end rings from overlapping these slits. This air gap is an air gap (normally several hundreds micrometers) between a stator and a rotor.

The present invention has been achieved to solve the above problems, and the present invention is to provide a rotor of an induction motor, an induction motor, a compressor, an air blower, and an air conditioner that can make a magnetic flux flow smoothly and can improve motor characteristics by causing an outer circumferential slot to approach to a rotor outer circumference and an inner circumferential slot that communicates with the outer circumferential slot and that is present inside of the outer circumferential slot to be present, by setting a circumferential width TC of an innermost circumference of the outer circumferential slot to be smaller than a circumferential width TD of an outermost circumference of the inner circumferential slot, and by setting a circumferential width of the outer circumferential slot to be smaller as the outer circumferential slot approaches to the rotor outer circumference.

A rotor of an induction motor regarding the present invention includes a squirrel-cage secondary conductor formed by filling a rotor slot of a rotor iron core with a nonmagnetic and conductive material. The rotor slot is constituted by an outer circumferential slot that is formed near an outer circumference of the rotor, and an inner circumferential slot that communicates with the outer circumferential slot and that is formed inside of the outer circumferential slot. A circumferential width TC of an innermost circumference of the outer circumferential slot is smaller than a circumferential width TD of an outermost circumference of the inner circumferential slot, and a circumferential width of the outer circumferential slot is smaller as the outer circumferential slot approaches to the outer circumference of the rotor.

The rotor of an induction motor according to the present invention is configured such that a rotor slot is constituted by an outer circumferential slot closer to a rotor outer circumference and an inner circumferential slot that communicates with the outer circumferential slot and that is formed inside of the outer circumferential slot, a circumferential width TC of an innermost circumference of the outer circumferential slot is set to be smaller than a circumferential width TD of an outermost circumference of the inner circumferential slot, and such that the circumferential width of the outer circumferential slot is set to be smaller as the outer circumferential slot approaches to the rotor outer circumference. Therefore, it is possible to relax the concentration of a secondary current and to improve characteristics of the induction motor.

DETAILED DESCRIPTION

First Embodiment

Figure 1:
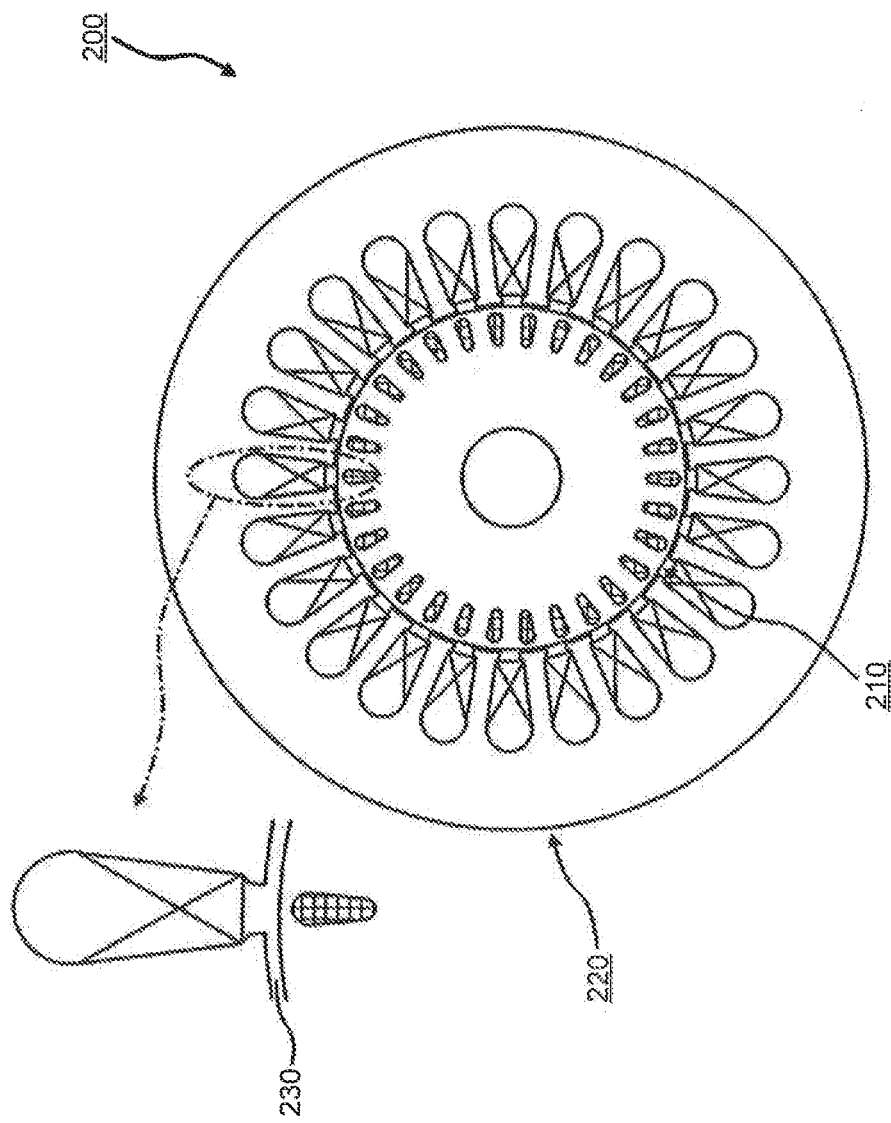
FIG. 1 is shown for a comparison, and is a horizontal cross-sectional view of a general induction motor 200.
Figure 2:
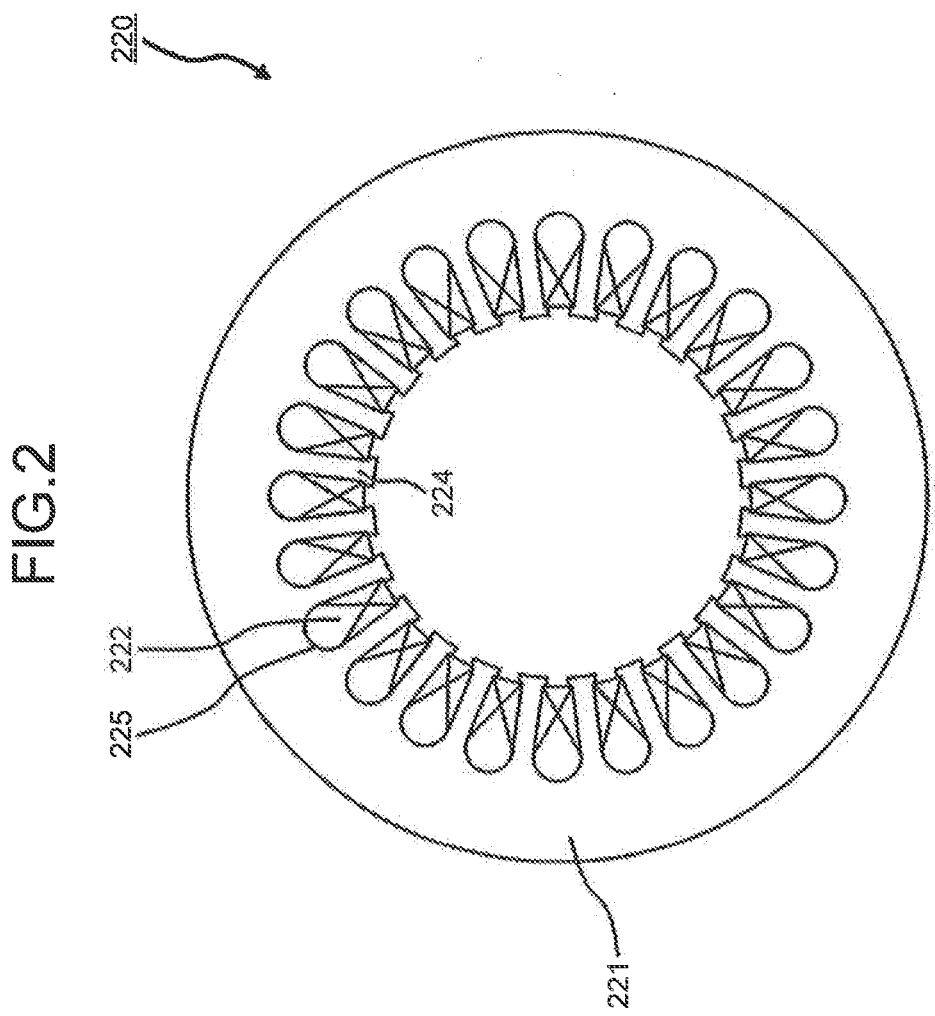
FIG. 2 is shown for a comparison, and is a horizontal cross-sectional view of a stator 220 of the general induction motor 200.
Figure 3:
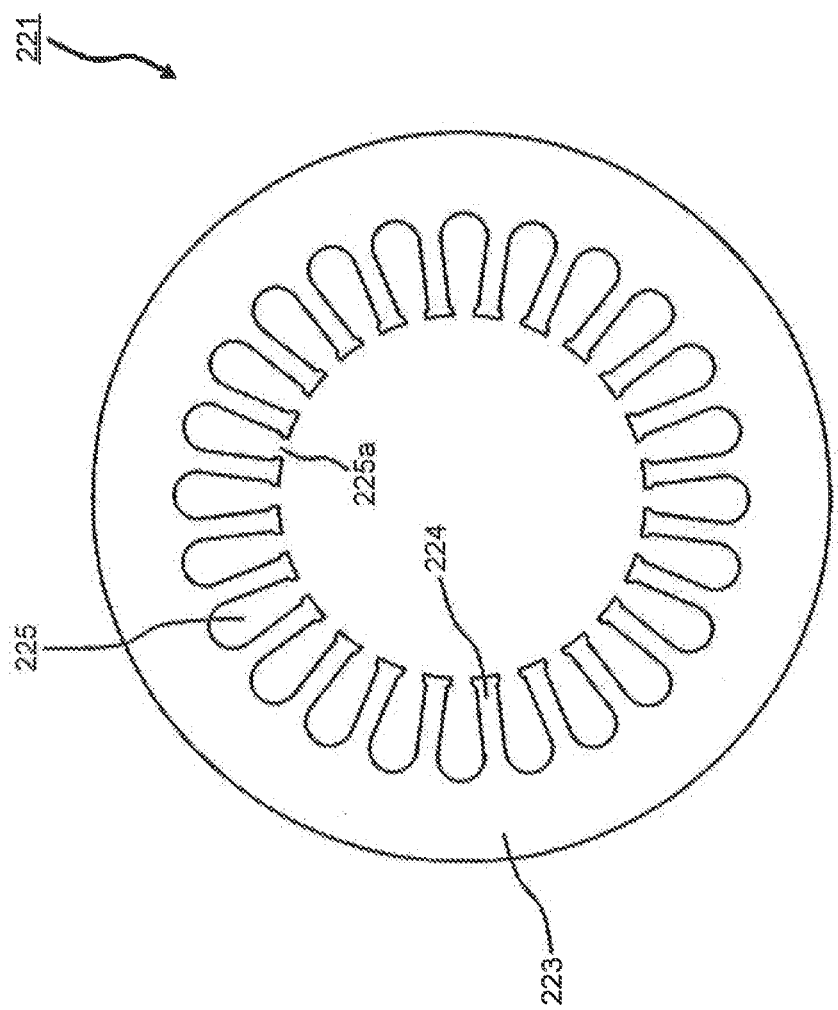
FIG. 3 is shown for a comparison, and is a horizontal cross-sectional view of a stator iron core 221 of the general induction motor 200.

FIGS. 1 to 3 are for shown for comparisons, where FIG. 1 is a horizontal cross-sectional view of a general induction motor 200, FIG. 2 is a horizontal cross-sectional view of a stator 220 of the general induction motor 200, and FIG. 3 is a horizontal cross-sectional view of a stator iron core 221 of the general induction motor 200.

As shown in FIG. 1, the general induction motor 200 (hereinafter, also simply "motor") includes the stator 220 and a rotor 210 arranged inside of the stator 220 via an air gap 230.

As shown in FIG. 2, the stator 220 includes the stator iron core 221 of a generally ring shape and a winding 222 inserted into each of slots 225 formed in the stator iron core 221. The winding 222 is a concentrated winding or a distributed winding wound around each of the teeth 224. The winding 222 is for a single phase or three phases.

The stator iron core 221 is produced by blanking magnetic steel sheets each having a thickness of 0.1 millimeter to 1.5 millimeters into a predetermined shape, stacking a predetermined number of resultant magnetic steel sheets in an axial direction, and fixing the stacked magnetic steel sheets by nipper caulking, welding, and the like.

As shown in FIG. 3, a ring-shaped core back 223 is formed on an outer circumference of the stator iron core 221, and a plurality of teeth 224 (24 teeth in FIG. 3) extend radially from an inner circumference of the core back 223 in a direction of the rotor 210. The teeth 224 are almost constant in circumferential width in a radial direction.

The slot 225 (a space) is formed between two of the adjacent teeth 224. The number of the slots 225 is equal to that of the teeth 224, that is, 24. Because the teeth 224 are almost constant in circumferential width in the radial direction, a circumferential width of each slot 225 gradually increases from the inside (near the rotor 210) toward outside (near the core back 223). The slot 225 is open to the air gap 230 (see FIG. 1) and the opening of the slot 225 is referred to as "slot opening part 225a (a slot opening)". The winding 222 is inserted from the slot opening part 225a.

Figure 4:
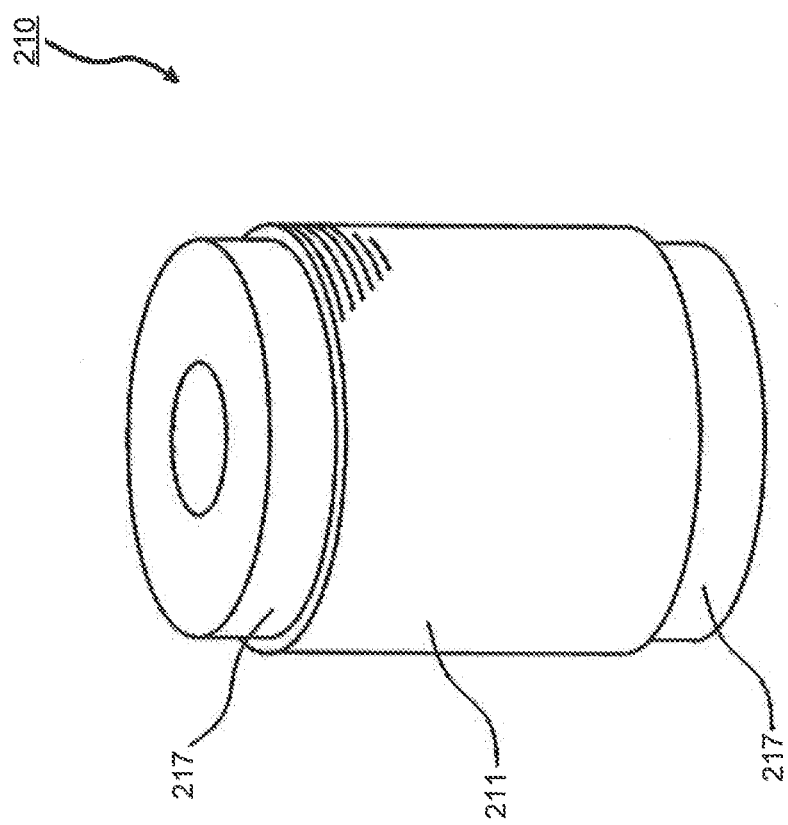
FIG. 4 is shown for a comparison, and is a perspective view of a rotor 210 of the general induction motor 200.
Figure 5:
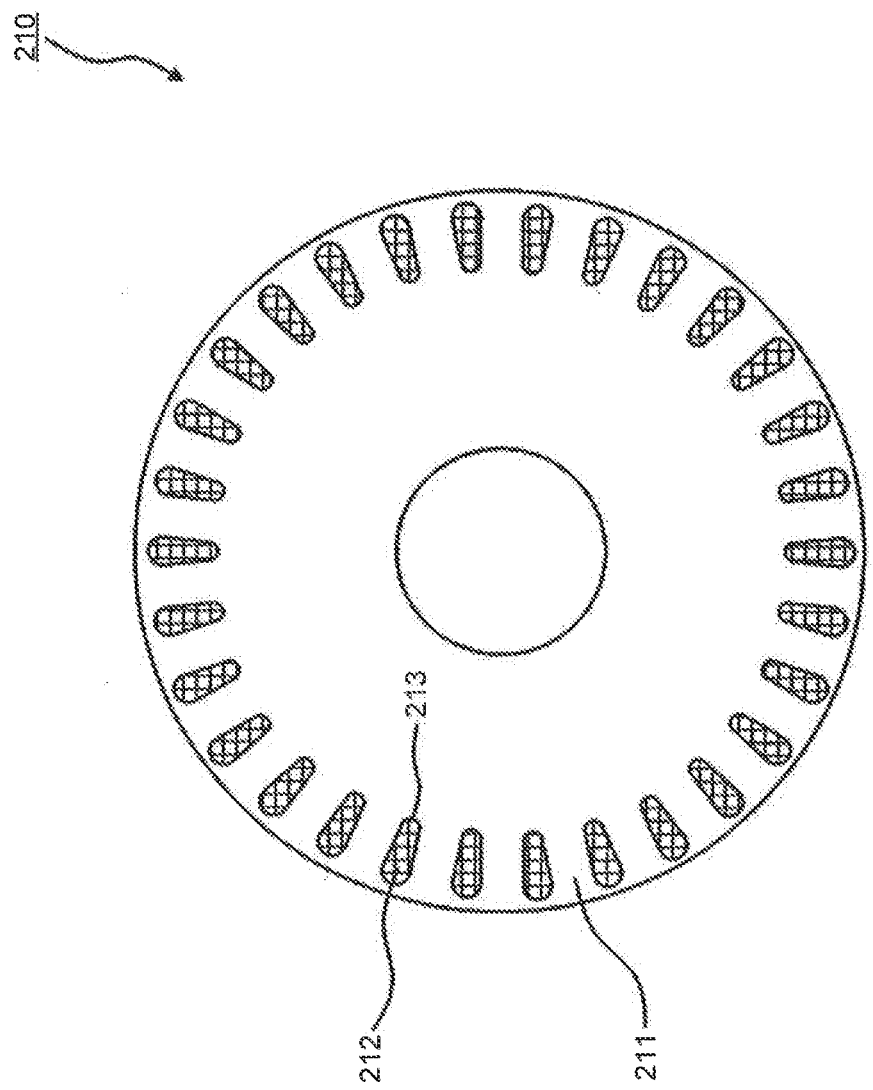
FIG. 5 is shown for a comparison, and is a horizontal cross-sectional view of the rotor 210 of the general induction motor 200.
Figure 6:
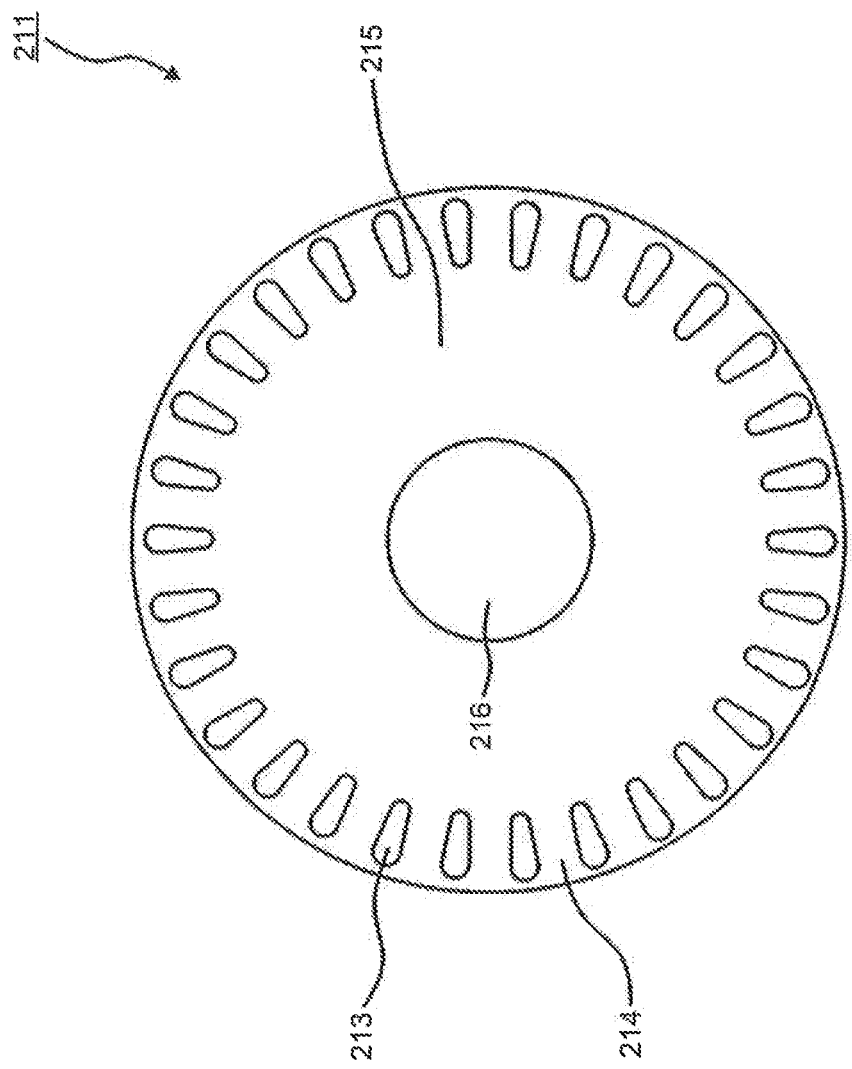
FIG. 6 is shown for a comparison, and is a horizontal cross-sectional view of a rotor iron core 211 of the general induction motor 200.

FIGS. 4 to 6 are for shown for comparisons, where FIG. 4 is a perspective view of the rotor 210 of the general induction motor 200, FIG. 5 is a horizontal cross-sectional view of the rotor 210 of the general induction motor 200, and FIG. 6 is a horizontal cross-sectional view of a rotor iron core 211 of the general induction motor 200.

As shown in FIG. 4, the rotor 210 includes the rotor iron core 211 and a squirrel-cage secondary conductor constituted by an aluminum bar 212 (see FIG. 5) and a pair of end rings 217 formed on both ends of the rotor 210 in a stacking direction, respectively. The aluminum bar 212 and the end rings 217 are produced by simultaneously casting aluminum by die casting. The squirrel-cage secondary conductor is often formed of copper other than aluminum.

As shown in FIG. 5, the aluminum bar 212 of the rotor 210 is formed by casting aluminum into a plurality (30) of rotor slots 213 of the rotor iron core 211. As described above, the aluminum bar 212 and the paired end rings 217 formed on the both ends of the rotor 210 in the stacking direction, respectively constitute the squirrel-cage secondary conductor.

Similarly to the stator iron core 221, the rotor iron core 211 is produced by blanking magnetic steel sheets each having a thickness of 0.1 millimeter to 0.5 millimeter into a predetermined shape, stacking a predetermined number of resultant magnetic steel sheets in the axial direction, and fixing the stacked magnetic steel sheets by nipper caulking, welding, and the like.

As shown in FIG. 6, the rotor iron core 211 has a generally circular cross-section, and a plurality (30) of rotor slots 213 are formed almost equidistantly in a circumferential direction of the rotor iron core 211. The rotor teeth 214 are formed between two of the adjacent rotor slots 213. The number of rotor teeth 214 is equal to that of the rotor slots 213, that is, 30. The rotor teeth 214 are almost constant in circumferential width in a radial direction. Therefore, a circumferential width of the rotor slot 213 gradually increases from the inside toward outside. A shaft hole 216 with which a driving shaft (not shown) is engaged is formed in a central portion of the rotor iron core 211. An iron core portion between the rotor slots 213 and the shaft hole 216 is referred to as "core back 215".

The rotor slots 213 are filled with a nonmagnetic and conductive material (aluminum, for example). Accordingly, when a magnetic flux of the stator 220 is interlinked with each of the rotor slots 213 and the magnetic flux changes, then a secondary current is generated in the aluminum bar 212, and a torque is generated by the secondary current and the magnetic flux from the stator 220.

Ideally, the magnetic flux from the stator 220 does not stride over a part of each of the rotor slots 213 of the rotor 210 but changes suddenly, thereby making the secondary current generated in each rotor slot 213 constant.

Figure 7:
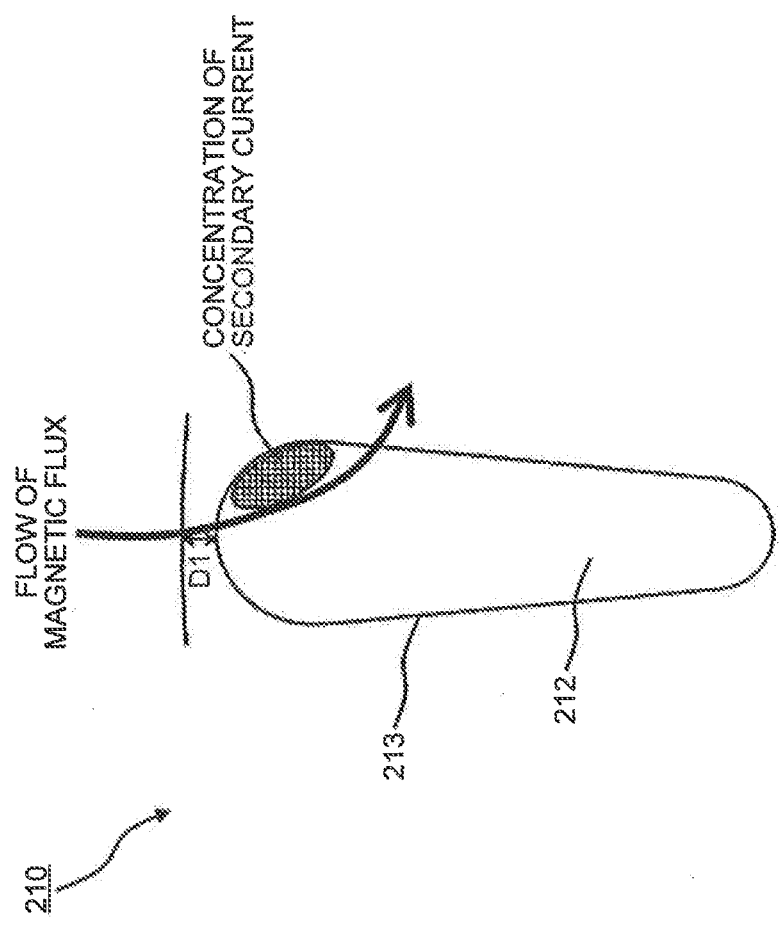
FIG. 7 is shown for a comparison, and depicts a concentrated state of a secondary current generated by interlinkage of a magnetic flux from the stator 220 in the rotor 210 of the general induction motor 200.
Figure 8:
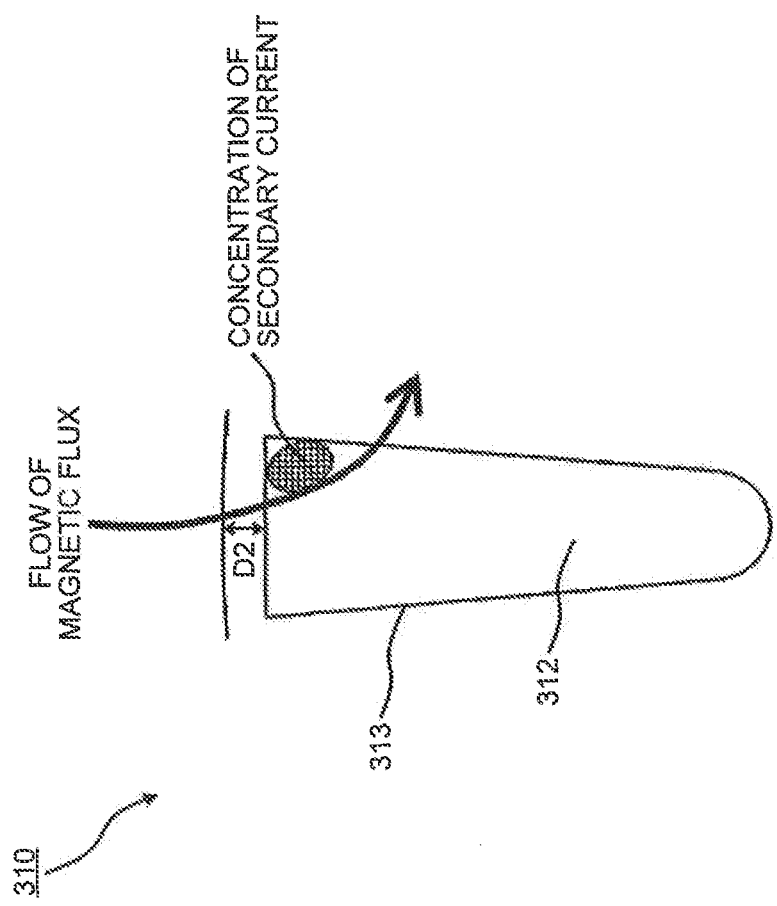
FIG. 8 is shown for a comparison, and depicts a concentrated state of a secondary current generated by interlinkage of a magnetic flux from a stator in another general rotor 310.

FIGS. 7 and 8 are for shown for comparisons, where FIG. 7 depicts a concentrated state of a secondary current generated by interlinkage of a magnetic flux from the stator 220 in the rotor 210 of the general induction motor 200, and FIG. 8 depicts a concentrated state of a secondary current generated by interlinkage of a magnetic flux from a stator in another general rotor 310.

As shown in FIG. 7, in the rotor 210 of the general induction motor 200, because of a small radial width D1 between each of the rotor slots 213 and a rotor outer circumference, the magnetic flux from the stator 220 is interlinked with a part of the rotor slot 213 (near a top of the rotor slot 213 near the outer circumference of the rotor 210 to an upper right corner of the rotor slot 213 (FIG. 7)). An arrow shown in FIG. 7 indicates a flow of the magnetic flux from the stator 220.

The secondary current flows while being concentrated on the part of the rotor slot 213 with which the magnetic flux from the stator 220 is interlinked by the influence of a change of the magnetic flux only in the part of the rotor slot 213. Because of the influence, the general induction motor 200 has problems such that a secondary resistance is high, a secondary copper loss is aggravated, and that the efficiency is degraded, as compared with a case where the secondary current flows in the entire rotor slot 213. This secondary copper loss is also referred to as "stray load loss" or "harmonic secondary copper loss".

Another general rotor 310 shown in FIG. 8 differs from the rotor 210 in the shape of a rotor slot 313. While the rotor slot 213 has a circular arc shape near the outer circumference of the rotor 210, the rotor slot 313 has a flat shape near an outer circumference of the rotor 310. In a case of this rotor 310, similarly to the rotor 210, because of a small radial width D2 between the rotor slot 313 and the outer circumference of the rotor 310, the magnetic flux from the stator is interlinked with a part of the rotor slot 313 (near a center of the rotor slot 313 near the outer circumference of the rotor 310 to an upper right corner of the rotor slot 313 (FIG. 8)). An arrow shown in FIG. 8 indicates a flow of the magnetic flux from the stator. An aluminum bar 312 is cast into the rotor slot 313.

The secondary current flows while being concentrated on the part of the rotor slot 313 with which the magnetic flux from the stator is interlinked by the influence of a change of the magnetic flux only in the part of the rotor slot 313. Because of the influence, another general induction motor has problems such that a secondary resistance is high, a secondary copper loss increases, and that the efficiency is degraded, as compared with a case where the secondary current flows in the entire rotor slot 313.

Figure 9:
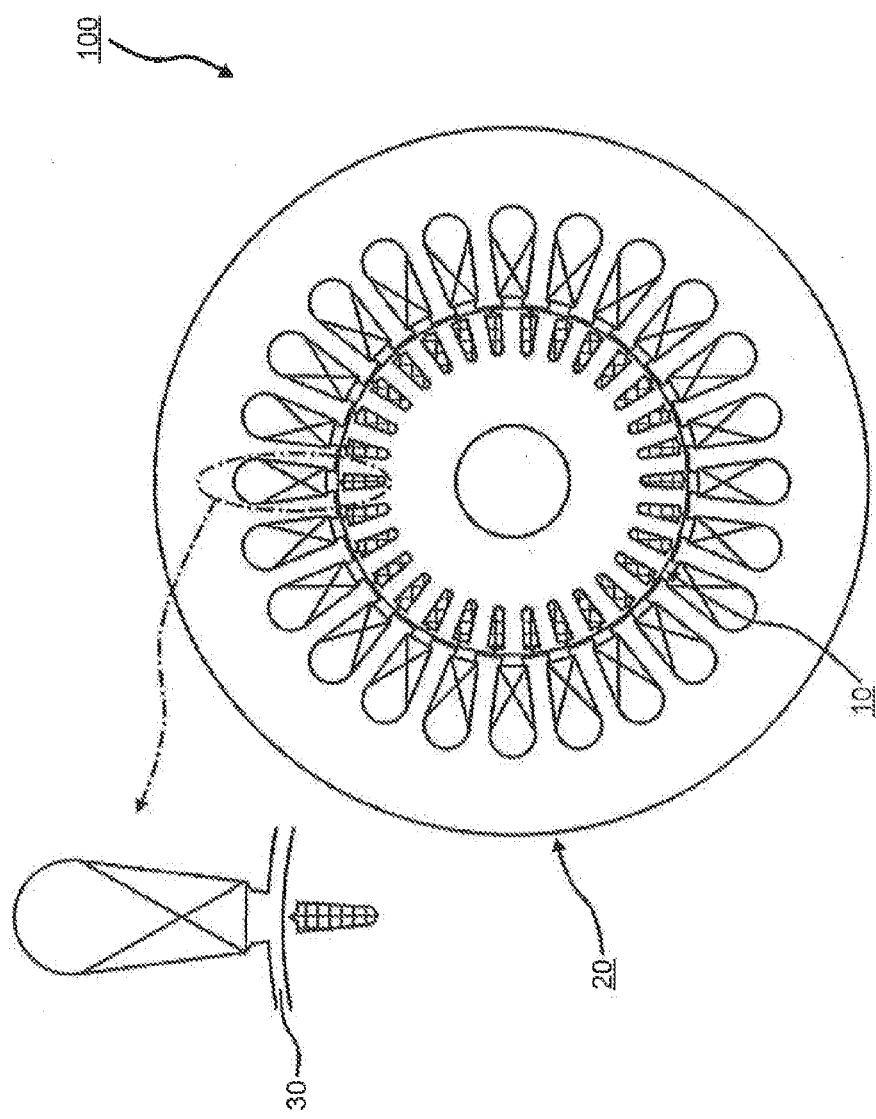
FIG. 9 depicts a first embodiment, and is a horizontal cross-sectional view of an induction motor 100.
Figure 10:
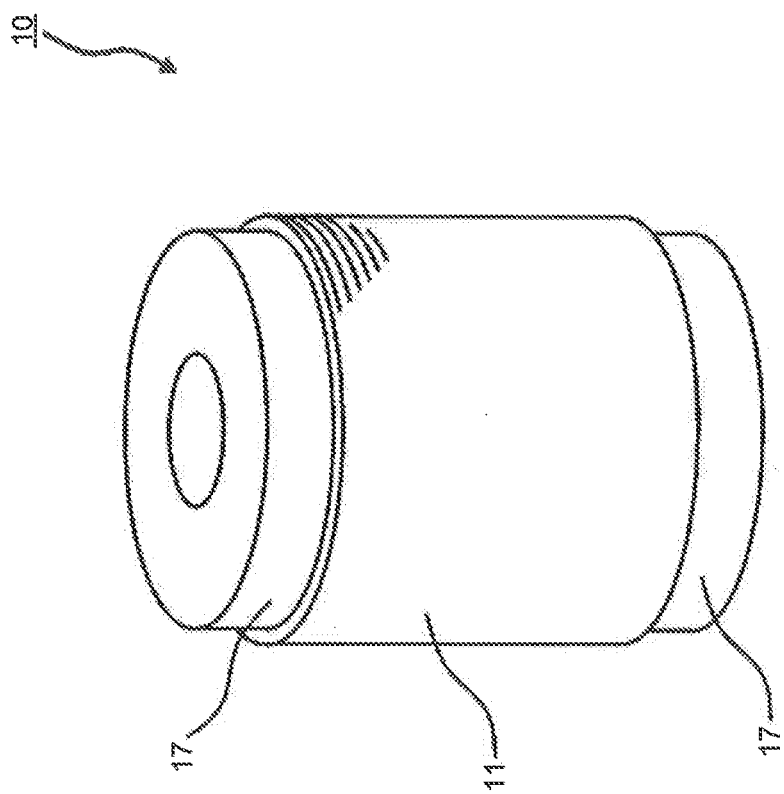
FIG. 10 depicts the first embodiment, and is a perspective view of a rotor 10 of the induction motor 100.
Figure 11:
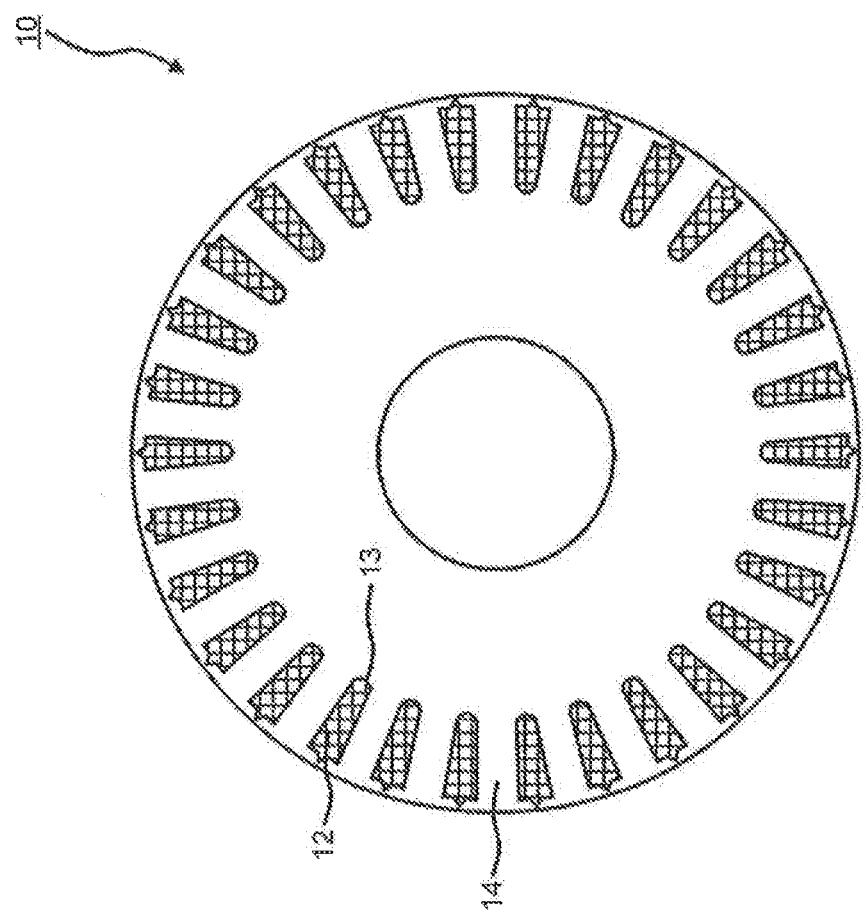
FIG. 11 depicts the first embodiment, and is a horizontal cross-sectional view of the rotor 10 of the induction motor 100.
Figure 12:
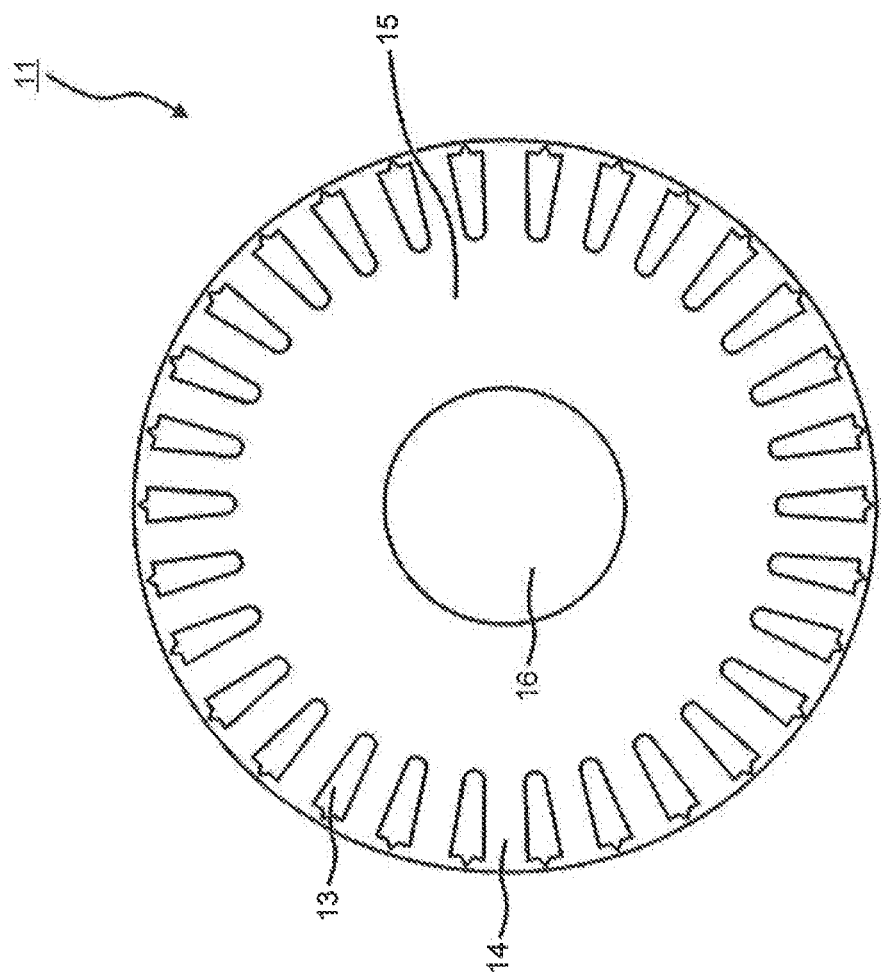
FIG. 12 depicts the first embodiment, and is a horizontal cross-sectional view of a rotor iron core 11 of the induction motor 100.

FIGS. 9 to 12 depict a first embodiment, where FIG. 9 is a horizontal cross-sectional view of an induction motor 100, FIG. 10 is a perspective view of a rotor 10 of the induction motor 100, FIG. 11 is a horizontal cross-sectional view of the rotor 10 of the induction motor 100, and FIG. 12 is a horizontal cross-sectional view of a rotor iron core 11 of the induction motor 100.

As shown in FIG. 9, the induction motor 100 according to the present embodiment includes a stator 20 and the rotor 10 arranged inside of the stator 20 via an air gap 30.

The stator 20 of the induction motor 100 according to the present embodiment is not described here because the stator 20 is similar in configuration to the stator 220 (see FIG. 2) of the general induction motor 200.

The induction motor 100 (hereinafter, also simply "motor") according to the present embodiment is characterized by the rotor 10. More specifically, the induction motor 100 is characterized by the shape of a rotor slot 13.

As shown in FIG. 10, the rotor 10 includes the rotor iron core 11 and a squirrel-cage secondary conductor constituted by an aluminum bar 12 (see FIG. 11, a nonmagnetic and conductive material) and a pair of end rings 17 formed on both ends of the rotor 10 in a stacking direction, respectively. The aluminum bar 12 and the end rings 17 are produced by simultaneously casting aluminum by die casting. The squirrel-cage secondary conductor is often formed of copper other than aluminum.

As shown in FIG. 11, the aluminum bar 12 of the rotor 10 is formed by casting aluminum into a plurality (30) of rotor slots 13 of the rotor iron core 11. As described above, the aluminum bar 12 and the paired end rings 17 formed on the both ends of the rotor 10 in the stacking direction, respectively constitute the squirrel-cage secondary conductor.

The rotor iron core 11 is produced by blanking magnetic steel sheets each having a thickness of 0.1 millimeter to 0.5 millimeter into a predetermined shape, stacking a predetermined number of resultant magnetic steel sheets in the axial direction, and fixing the stacked magnetic steel sheets by nipper caulking, welding, and the like.

As shown in FIG. 12, the rotor iron core 11 has a generally circular cross-section, and a plurality (30) of rotor slots 13 are formed almost equidistantly in a circumferential direction of the rotor iron core 11. Rotor teeth 14 are formed between two of the adjacent rotor slots 13. The number of rotor teeth 14 is equal to that of the rotor slots 13, that is, 30. The rotor teeth 14 are almost constant in circumferential width in a radial direction. Therefore, a circumferential width of the rotor slot 13 gradually increases from the inside toward outside. A shaft hole 16 with which a driving shaft (not shown) is engaged is formed in a central portion of the rotor iron core 11. An iron core portion between the rotor slots 13 and the shaft hole 16 is referred to as "core back 15".

Figure 13:
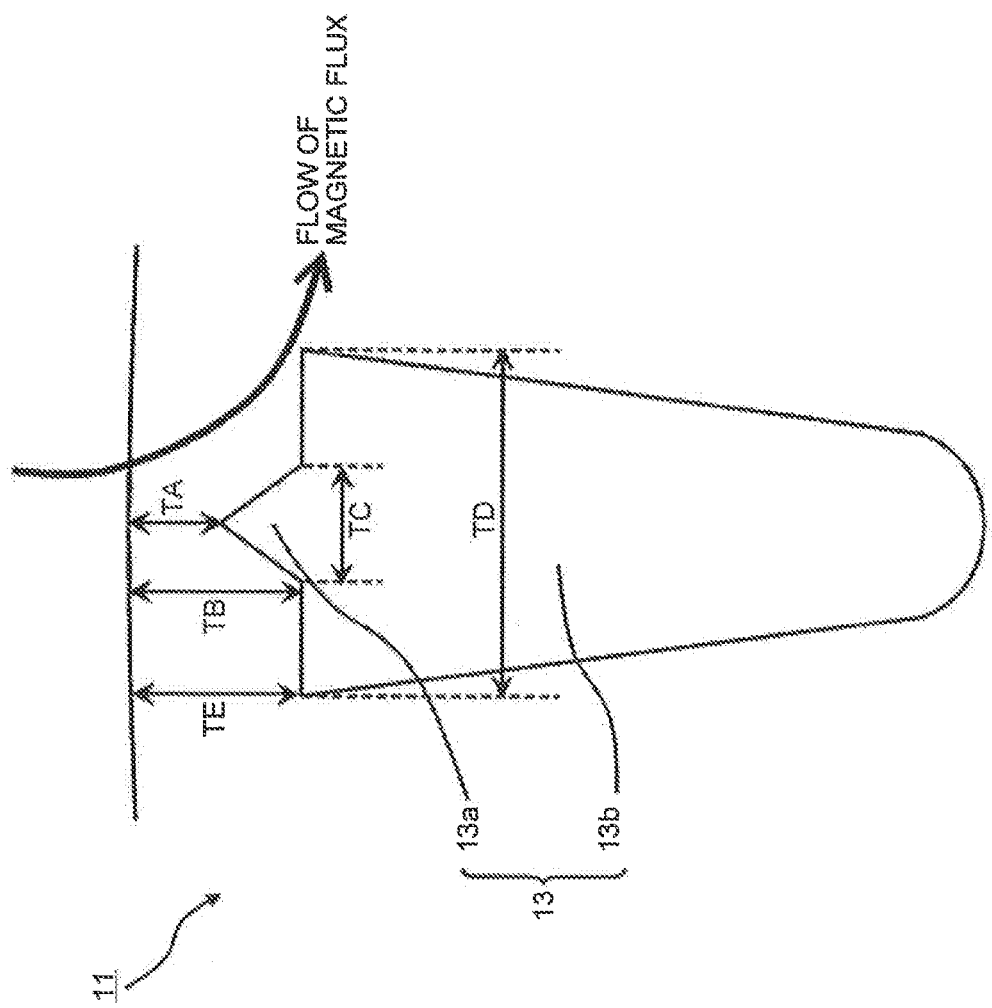
FIG. 13 depicts the first embodiment, and is an enlarged view of a rotor slot 13.

FIG. 13 depicts the first embodiment, and is an enlarged view of the rotor slot 13. As shown in FIG. 13, the rotor slot 13 is constituted by an outer circumferential slot 13a closer to a rotor outer circumference and an inner circumferential slot 13b communicating with the outer circumferential slot 13a and formed inside of the outer circumferential slot 13a. The shape of the outer circumferential slot 13a is a generally triangular shape, and that of the inner circumferential slot 13b resembles that of the rotor slot 313 (see FIG. 8) of the general rotor 310.

Dimensions of the respective elements of the rotor slot 13 are defined as follows.

TA: a shortest distance between the outer circumferential slot 13a and the rotor outer circumference;

TB: a shortest distance between a center side of the inner circumferential slot 13b and the rotor outer circumference;

TC: a circumferential width of an innermost circumference of the outer circumferential slot 13a;

TD: a circumferential width of an outermost circumference of the inner circumferential slot 13b; and TE: a shortest distance between an end side of the inner circumferential slot 13b and the rotor outer circumference.

As shown in FIG. 13, the circumferential width TC of the innermost circumference of the outer circumferential slot 13a is smaller than the circumferential width TD of the outermost circumference of the inner circumferential slot 13b. Furthermore, a circumferential width of the outer circumferential slot 13a is set smaller as the outer circumferential slot 13a approaches to the rotor outer circumference so as to relax the concentration of a secondary current and to improve the characteristics of the induction motor 100. This principle is explained below.

In each of the general rotor slots 213 and 313 shown in FIGS. 7 and 8, the magnetic flux from the stator flows in such a manner as to glance off the slot 213 or 313. The radial dimension D1 or D2 between the rotor slot 213 or 313 and the rotor outer circumference is small, and a magnetic flux density increases up to a magnetic saturation region in the portion, and a circumferential width of the portion is large. This is why the magnetic flux from the stator flows in such a manner as to glance off the rotor slot 213 or 313.

It suffices to make the radial width between the rotor slot 213 or 313 and the rotor outer circumference larger so as to prevent this magnetic flux from the stator from glancing off the rotor slot 213 or 313. However, when the radial width between the rotor slot 213 or 313 and the rotor outer circumference is increased, then a leakage magnetic flux that passes between the rotor slot 213 or 313 and the rotor outer circumference increases, and the motor characteristics are degraded.

As shown in FIG. 13, the rotor slot 13 according to the present embodiment is constituted by the outer circumferential slot 13a closer to the rotor outer circumference and the inner circumferential slot 13b communicating with the outer circumferential slot 13a and formed inside of the outer circumferential slot 13a. Furthermore, the circumferential width TC of the innermost circumference of the outer circumferential slot 13a is smaller than the circumferential width TD of the outermost circumference of the inner circumferential slot 13b, and the circumferential width of the outer circumferential slot 13a is smaller as the outer circumferential slot 13a approaches to the rotor outer circumference. Therefore, no slots are present near the rotor outer circumference, which prevents the magnetic flux from the stator 20 from glancing off each rotor slot 13.

Furthermore, it is possible to make the slots present near the rotor outer circumference small because the circumferential width of the outer circumferential slot 13a is smaller as the outer circumferential slot 13a approaches to the rotor outer circumference. Furthermore, it is possible to prevent a leakage magnetic flux that passes between the outer circumferential slot 13a and the rotor outer circumference by reducing the shortest distance TA between the outer circumferential slot 13a and the rotor outer circumference (to 0.3 millimeter, for example).

Furthermore, the circumferential width TC of the innermost circumference of the outer circumferential slot 13a is set to be 1.5 times or more as large as a thickness T (0.1 millimeter to 1.5 millimeters) of the magnetic steel sheet in view of the blanking characteristics of a metal mold. The circumferential width of the outer circumferential slot 13a is set to be gradually smaller as the outer circumferential slot 13a approaches to the rotor outer circumference.

Further, the outer circumferential slot 13a can prevent the magnetic flux from the stator 20 from flowing in such a manner as to glance off the rotor slot 13. Accordingly, the circumferential width TD of the outermost circumference of the inner circumferential slot 13b is set to be larger than the circumferential width TC of the innermost circumference of the outer circumferential slot 13a so as to increase an area of the inner circumferential slot 13b. When the area of the inner circumferential slot 13b increases, then the secondary resistance decreases and the motor efficiency is improved.

Furthermore, the rotor slot 13 according to the present embodiment has the following effects. Because of the small outer circumferential slot 13a as compared with the general rotor slot, a thin portion between the rotor slot 13 and the rotor outer circumference is made thinner, the blanking characteristics of the metal mold are improved, and the maintenance and life of the metal mold are improved.

The shortest distance TB between the center side of the inner circumferential slot 13b and the rotor outer circumference and the shortest distance TE between the end side of the inner circumferential slot 13b and the rotor outer circumference are described next.

Although it is preferable that the center and end sides of the inner circumferential slot 13b are away from the rotor outer circumference to some extent as for the shortest distance TB between the center side of the inner circumferential slot 13b and the rotor outer circumference and the shortest distance TE between the end side of the inner circumferential slot 13b and the rotor outer circumference, specific dimensions are unclear. When the center and end sides are made too close to the rotor outer circumference, then the magnetic flux from the stator glances off the rotor slot, the secondary current is concentrated on a part of the rotor slot, and the efficiency is degraded similarly to the general rotor slots.

Figure 14:
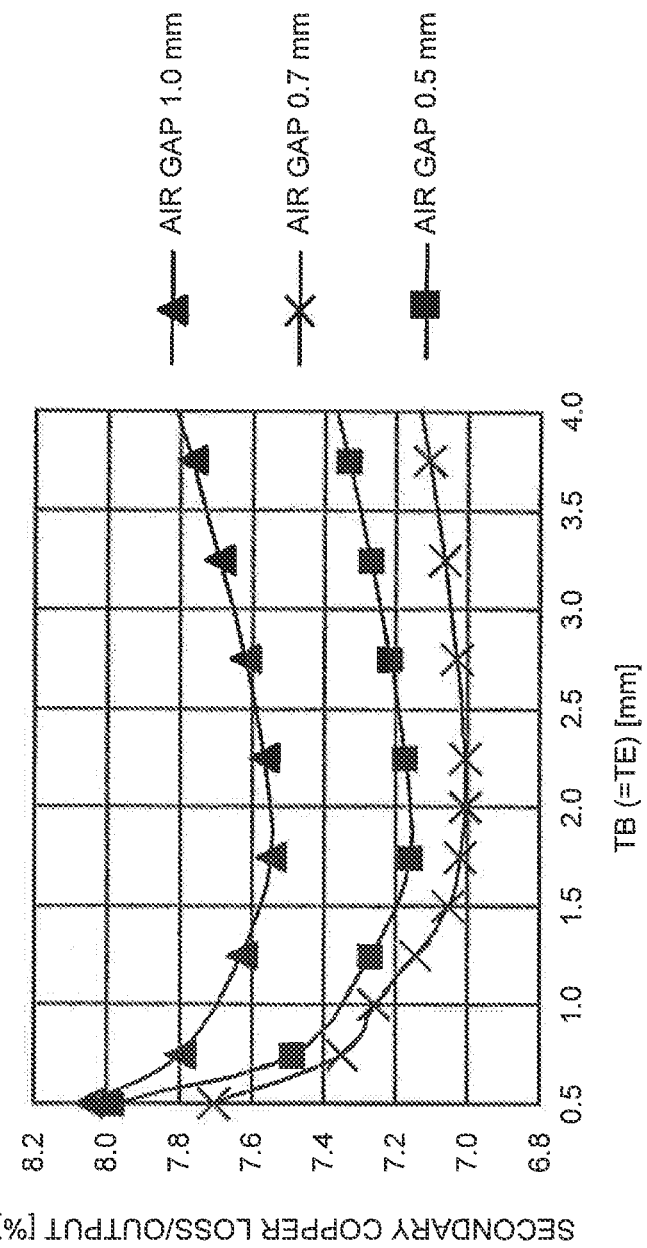
FIG. 14 depicts the first embodiment, and depicts characteristics of secondary copper loss/output [%] to TB (=TE).
Figure 15:
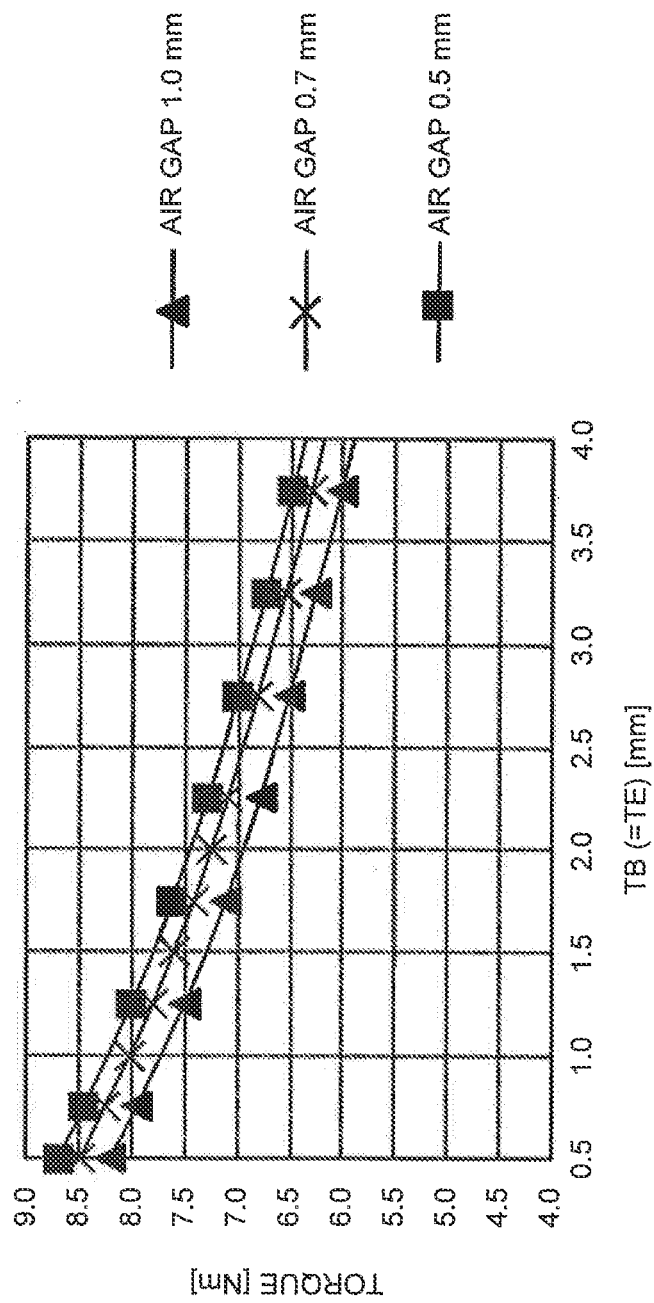
FIG. 15 depicts the first embodiment, and depicts characteristics of a torque to the TB (=TE).

In this connection, the characteristics of the induction motor 100 with respect to the TB and TE are calculated. FIGS. 14 and 15 depict the first embodiment, where FIG. 14 depicts characteristics of secondary copper loss/output [%] to the TB (=TE), and FIG. 15 depicts characteristics of the torque to the TB (=TE).

FIG. 14 depicts the characteristics of the secondary copper loss/output [%] to the TB (=TE), and FIG. 15 depicts the characteristics of the torque to the TB (=TE) while a voltage, a frequency, and the number of revolutions are assumed to be constant and the air gap is set to 0.5 millimeter, 0.7 millimeter, and 1.0 millimeter. It can be confirmed from the characteristics of the secondary copper loss/output [%] to the TB (=TE) shown in FIG. 14 that a ratio of the secondary copper loss to the output changes as follows when changing the TB.

It can be confirmed from FIG. 14 that the secondary copper loss/output [%] rapidly decreases when the TB is increased from 0.5 millimeter. This indicates that the increased TB can reduce the concentration of the secondary current after the magnetic flux from the stator 20 glances off the rotor slot 13. Furthermore, the secondary copper loss/output [%] gently decreases when the TB is near 1.0 millimeter, reaches a bottom when the TB is 1.5 millimeters to 2.0 millimeters, and gently increases thereafter. It can be also confirmed from FIG. 14 that this effect does not greatly change even when the air gap is changed.

Furthermore, it can be confirmed from FIG. 15 that the torque decreases when increasing the TB. This is because a slot area decreases and the secondary resistance increases by increasing the TB.

A slip of the induction motor tends to increase (the number of revolutions thereof tends to decrease) at a maximum torque (a stalling torque) when the secondary resistance increases. Accordingly, in an analysis with the number of revolutions set constant, the torque decreases when the secondary resistance increases.

It is preferable from the above that the TB is set to be longer than 1.0 millimeter at which the loss starts to gently decrease from the aspect of the loss but that the TB is short from the aspect of the torque. Therefore, taking the two characteristics into consideration, it is preferable to use the TB or the TE set to satisfy 1.0 mm≤TB≤2.5 mm (1.0 mm≤TE≤2.5 mm).

Furthermore, portions of the magnetic steel sheets that are not used effectively are present when the TB is longer than the TE, depending on the flow of the magnetic flux from the stator 20. Therefore, the shortest distance TB between the center side of the inner circumferential slot 13b and the rotor outer circumference and the shortest distance TE between the end side of the inner circumferential slot 13b and the rotor outer circumference preferably satisfy a relation of TB≤TE.

Further, by setting the shortest distance TA between the outer circumferential slot 13a and the rotor outer circumference to be smaller than the thickness T of each of the magnetic steel sheets that constitute the rotor iron core 11, it is possible to reduce leakage of the magnetic flux from between the rotor slot 13 and the rotor outer circumference, to effectively use the magnetic flux, and to effectively improve the output and the efficiency. These effects are described below.

Generally, the shortest distance TA between the outer circumferential slot 13a and the rotor outer circumference is often set as short as possible. This is intended to reduce the magnetic flux that passes between the rotor slot 13 and the rotor outer circumference and that is not interlinked with the rotor slot 13 as much as possible, and to effectively use the magnetic flux from the stator 20.

However, in the case of the general rotor slots 213 and 313 shown in FIGS. 7 and 8, when the radial width between the rotor slot 213 or 313 and the rotor outer circumference is reduced, the magnetic flux from the stator glances off the rotor slot because a circumferential width therebetween is also large. Accordingly, the secondary copper loss is disadvantageously aggravated although the magnetic flux can be effectively used.

In the case of the rotor slot 13 (having the shape shown in FIG. 13) according to the present embodiment, even when the shortest distance TA between the outer circumferential slot 13a and the rotor outer circumference is reduced, the magnetic flux from the stator 20 does not glance off the rotor slot 13 but can be effectively used.

Furthermore, by setting the shortest distance TA between the outer circumferential slot 13a and the rotor outer circumference to be smaller than the thickness T of each of the magnetic steel sheets that constitute the rotor iron core 11, the magnetic characteristics of the radial thin portion between the outer circumferential slot 13a and the outer circumference are degraded by blanking distortion.

When the magnetic characteristics of the radial thin portion between the outer circumferential slot 13a and the rotor outer circumference are degraded, the saturation magnetic flux density decreases. Therefore, it is possible to reduce the magnetic flux that passes between the outer circumferential slot 13a and the rotor outer circumference and that is not interlinked with the rotor slot 13.

Besides, in the case of the general rotor slots 213 and 313 (FIGS. 7 and 8), the secondary copper loss is aggravated because the circumferential width is also large and the magnetic flux from the stator glances off the rotor slot 213 or 313. In the case of the rotor slot 13 (see FIG. 13) according to the present embodiment, it is possible to prevent the magnetic flux from the stator 20 from glancing off the rotor slot 13 and to reduce the aggravation of the secondary copper loss.

Figure 16:
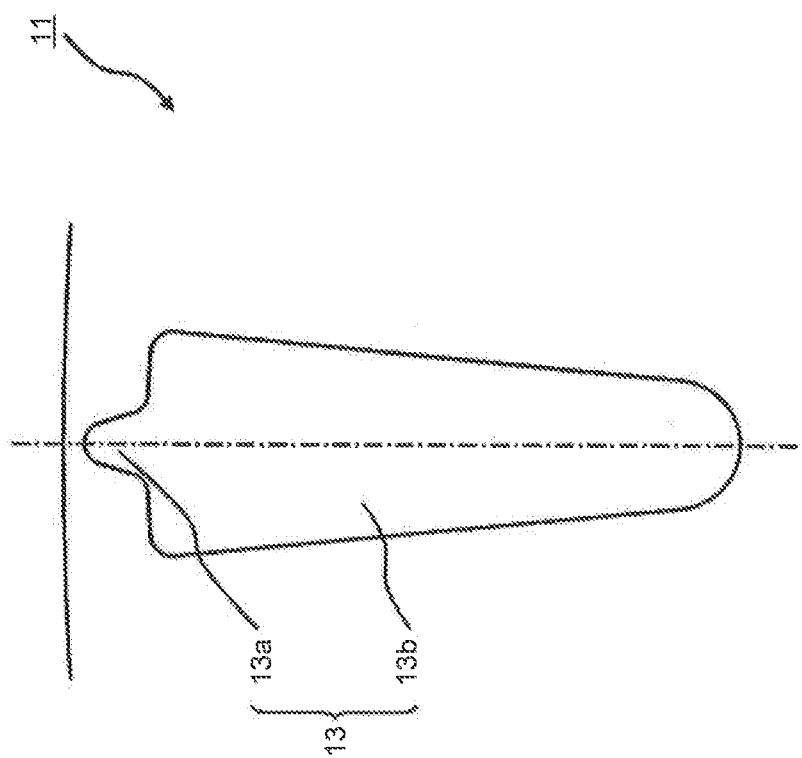
FIG. 16 depicts the first embodiment, and is an enlarged view of the rotor slot 13 according to the embodiment.
Figure 17:
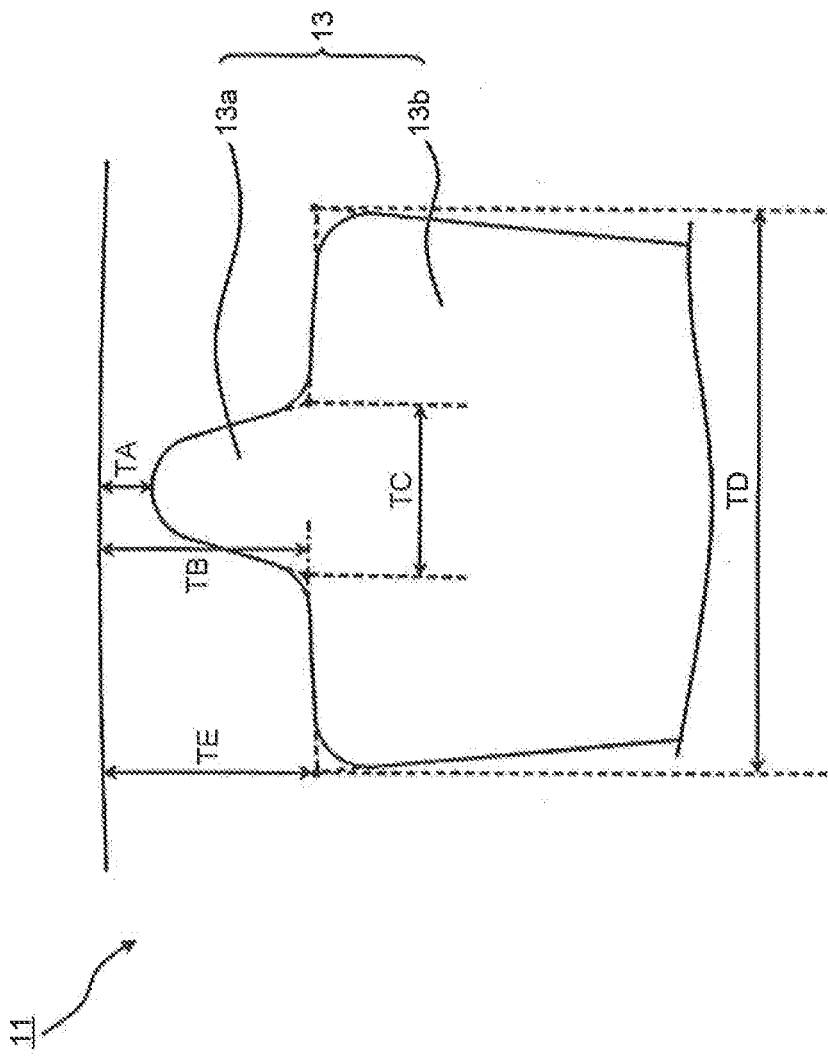
FIG. 17 is a partial enlarged view of FIG. 16.

FIG. 16 depicts the first embodiment, and is an enlarged view of the rotor slot 13 according to the embodiment, and FIG. 17 is a partial enlarged view of FIG. 16. Although rounding of the rotor slot 13 is omitted in FIG. 13 so as to clearly define the dimensions of respective elements, respective corners of the rotor slot 13 are rounded in practice. An example of the embodiment the rotor slot 13 is described with reference to FIGS. 16 and 17.

As shown in FIG. 16, the corners of the rotor slot 13 are rounded. This is because corners of the metal mold used for blanking to produce the rotor iron core 11 are normally rounded.

Furthermore, dimensions of the respective elements are those as shown in FIG. 17.

Next, the efficiency of a compressor, an air blower, and the like can be improved by using the induction motor 100 that uses the rotor 10 according to the present embodiment in each of the compressor, the air blower, and the like. A compressor (specifically, a two-cylinder rotary compressor) in which the induction motor 100 using the rotor 10 according to the present embodiment is incorporated is described below.

Figure 18:
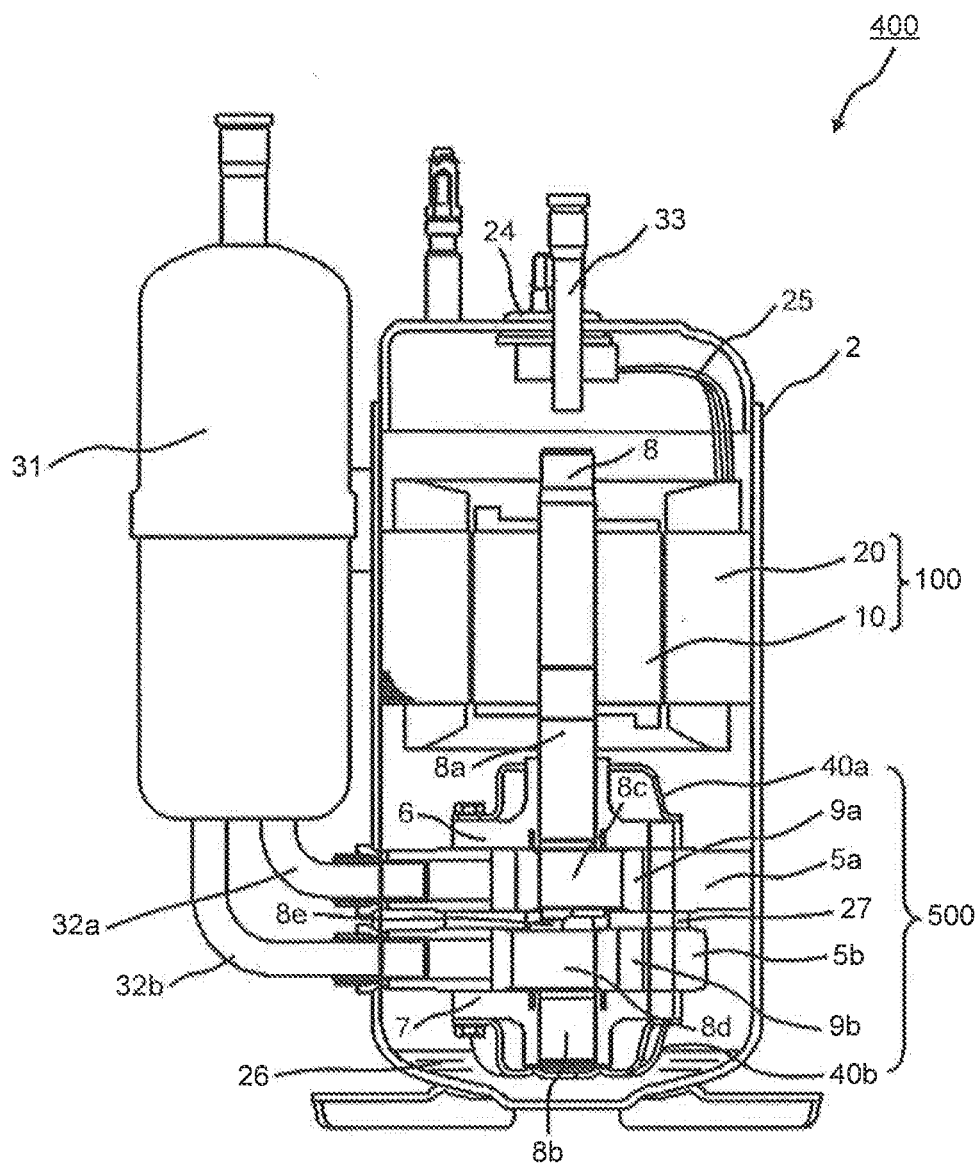
FIG. 18 depicts the first embodiment, and is a vertical cross-sectional view of a two-cylinder rotary compressor 400.

FIG. 18 depicts the first embodiment, and is a vertical cross-sectional view of a two-cylinder rotary compressor 400. A configuration of the two-cylinder rotary compressor 400 (an example of a hermetic compressor) is described with reference to FIG. 18. The two-cylinder rotary compressor 400 accommodates the induction motor 100 that is constituted by the stator 20 and the rotor 10 according to the present embodiment and a compression mechanical unit 500 that is driven by the induction motor 100 in a hermetic container 2 in a high-pressure atmosphere. The induction motor 100 is a single-phase induction motor.

As an example of the hermetic compressor, while the two-cylinder rotary compressor 400 is described here, a scroll compressor, a single-cylinder rotary compressor, a multistage rotary compressor, a swing rotary compressor, a vane compressor, a reciprocating compressor, and the like other than the two-cylinder rotary compressor can be used as the example of the hermetic compressor.

A turning force of the induction motor 100 is transmitted to the compression mechanical unit 500 via a main shaft 8a of a rotational shaft 8.

The rotational shaft 8 includes the main shaft 8a fixed to the rotor 10 of the induction motor 100, a secondary shaft 8b provided on a side opposite to the main shaft 8a, a main-shaft-side eccentric unit 8c and a secondary-shaft-side eccentric unit 8d formed by providing a predetermined phase difference (180°, for example) between the main shaft 8a and the secondary shaft 8b, and an intermediate shaft 8e provided between the main-shaft-side eccentric unit 8c and the secondary-shaft-side eccentric unit 8d.

A main bearing 6 is fitted into the main shaft 8a of the rotational shaft 8 with a clearance kept therebetween for sliding, and rotatably and pivotally supports the main shaft 8a.

A secondary bearing 7 is fitted into the secondary shaft 8b of the rotational shaft 8 with a clearance kept therebetween for sliding, and rotatably and pivotally supports the secondary shaft 8b.

The compression mechanical unit 500 includes a first cylinder 5a near the main shaft 8a and a second cylinder 5b near the secondary shaft 8b.

The first cylinder 5a has a cylindrical internal space, and a first piston 9a (a rolling piston) rotatably fitted into the main-shaft-side eccentric unit 8c of the rotational shaft 8 is provided in this internal space. A first vane (not shown) reciprocating in proportion to the rotation of the main-shaft-side eccentric unit 8c is also provided in the first cylinder 5a.

The first vane is accommodated in a vane groove of the first cylinder 5a and always pressed against the first piston 9a by a vane spring (not shown) provided in a back-pressure chamber. In the two-cylinder rotary compressor 400, an internal pressure of the hermetic container 2 is high. Accordingly, when the two-cylinder rotary compressor 400 starts operating, a force generated by a differential pressure between the high internal pressure of the hermetic container 2 and a pressure of a cylinder chamber acts on a rear surface (a back-pressure chamber side) of the vane. Therefore, the vane spring is mainly used to press the first vane against the first piston 9a at the time of starting the two-cylinder rotary compressor 400 (in a state of no difference between the internal pressure of the hermetic container 2 and the pressure of the cylinder chamber). The shape of the first vane is a flat and generally rectangular parallelepiped shape (the circumferential thickness is smaller than radial and axial lengths). A second vane (described later) is configured similarly to the first vane.

An intake port (not shown) through which inhaled gas from a refrigerating cycle passes penetrates the cylinder chamber from an outer circumferential surface of the first cylinder 5a. A discharge port (not shown) formed by cutting out neighborhoods of an edge of a circle (an end surface near the induction motor 100) forming the cylinder chamber that is a generally circular space is provided in the first cylinder 5a.

A compression chamber is formed by blocking both axial end surfaces of the internal space of the first cylinder 5a that accommodates the first piston 9a rotatably fitted into the main-shaft-side eccentric unit 8c of the rotational shaft 8 and the first vane with the main bearing 6 and a partition plate 27.

The first cylinder 5a is fixed to an inner circumferential portion of the hermetic container 2.

Similarly to the first cylinder 5a, the second cylinder 5b has a cylindrical internal space, and a second piston 9b (a rolling piston) rotatably fitted into the secondary-shaft-side eccentric unit 8d of the rotational shaft 8 is provided in this internal space. A second vane (not shown) reciprocating in proportion to the rotation of the secondary-shaft-side eccentric unit 8d is also provided in the second cylinder 5b. The first piston 9a and the second piston 9b are simply defined as "pistons".

Similarly to the first cylinder 5a, an intake port (not shown) through which the inhaled gas from the refrigerating cycle passes penetrates a cylinder chamber from an outer circumferential surface of the second cylinder 5b. A discharge port (not shown) formed by cutting out neighborhoods of an edge of a circle (an end surface opposite to the induction motor 100) forming the cylinder chamber that is a generally circular space is provided in the second cylinder 5b.

A compression chamber is formed by blocking both axial end surfaces of the internal space of the second cylinder 5b that accommodates the second piston 9b rotatably fitted into the secondary-shaft-side eccentric unit 8d of the rotational shaft 8 and the second vane with the secondary bearing 7 and the partition plate 27.

The compression mechanical unit 500 bolts the first cylinder 5a to the main bearing 6 and also the second cylinder 5b to the secondary bearing 7, and then axially and fixedly bolts the second cylinder 5b from outside of the main bearing 6 to the first cylinder 5a from outside of the secondary bearing 7 with the partition plate 27 held therebetween.

A discharge muffler 40a is attached to outside (a side of the induction motor 100) of the main bearing 6. High-temperature and high-pressure gas discharged from a discharge valve (not shown) provided on the main bearing 6 is temporarily put into the discharge muffler 40a and then discharged from a discharge hole (not shown) of the discharge muffler 40a into the hermetic container 2.

A discharge muffler 40b is attached to outside (an opposite side to the induction motor 100) of the secondary bearing 7. High-temperature and high-pressure gas discharged from a discharge valve (not shown) provided on the secondary bearing 7 is temporarily put into the discharge muffler 40b and then discharged from a discharge hole (not shown) of the discharge muffler 40b into the hermetic container 2.

An accumulator 31 is provided to be adjacent to the hermetic container 2. Suction tubes 32a and 32b communicate the first cylinder 5a and the second cylinder 5b with the accumulator 31, respectively.

Refrigerant gas compressed by the first cylinder 5a and the second cylinder 5b is discharged into the hermetic container 2 and fed out from a discharge tube 33 to a high pressure side of the refrigerating cycle.

Furthermore, power is supplied to the induction motor 100 via a lead 25 from a glass terminal 24.

Lubricating oil 26 (refrigerant oil) lubricating respective sliding units of the compression mechanical unit 500 is stored in a bottom portion within the hermetic container 2.

The lubricating oil is supplied to the respective sliding units of the compression mechanical unit 500 by raising the lubricating oil 26 stored in the bottom portion of the hermetic container 2 along an inside diameter of the rotational shaft 8 by a centrifugal force generated by the rotation of the rotational shaft 8 and supplying the lubricating oil 26 from an oil feeding hole (not shown) provided in the rotational shaft 8. The lubricating oil is supplied from the oil feeding hole to the sliding units between the main shaft 8a and the main bearing 6, between the main-shaft-side eccentric unit 8c and the first piston 9a, between the secondary-shaft-side eccentric unit 8d and the second piston 9b, and between the secondary shaft 8b and the secondary bearing 7, respectively.

The efficiency of the two-cylinder rotary compressor 400 configured as described above can be improved by using the induction motor 100 (a single-phase induction motor) that uses the rotor 10 according to the present embodiment.

Furthermore, although detailed explanations thereof are omitted, when the induction motor 100 (a single-phase induction motor) that uses the rotor 10 according to the present embodiment is used in, for example, an air blower besides the compressor, it is possible to improve the efficiency of the air blower.

Further, the efficiency of an air conditioner in which the compressor, the air blower, and the like are incorporated can be improved. An example of the air conditioner is described with reference to FIGS. 19 and 20.

Figure 19:
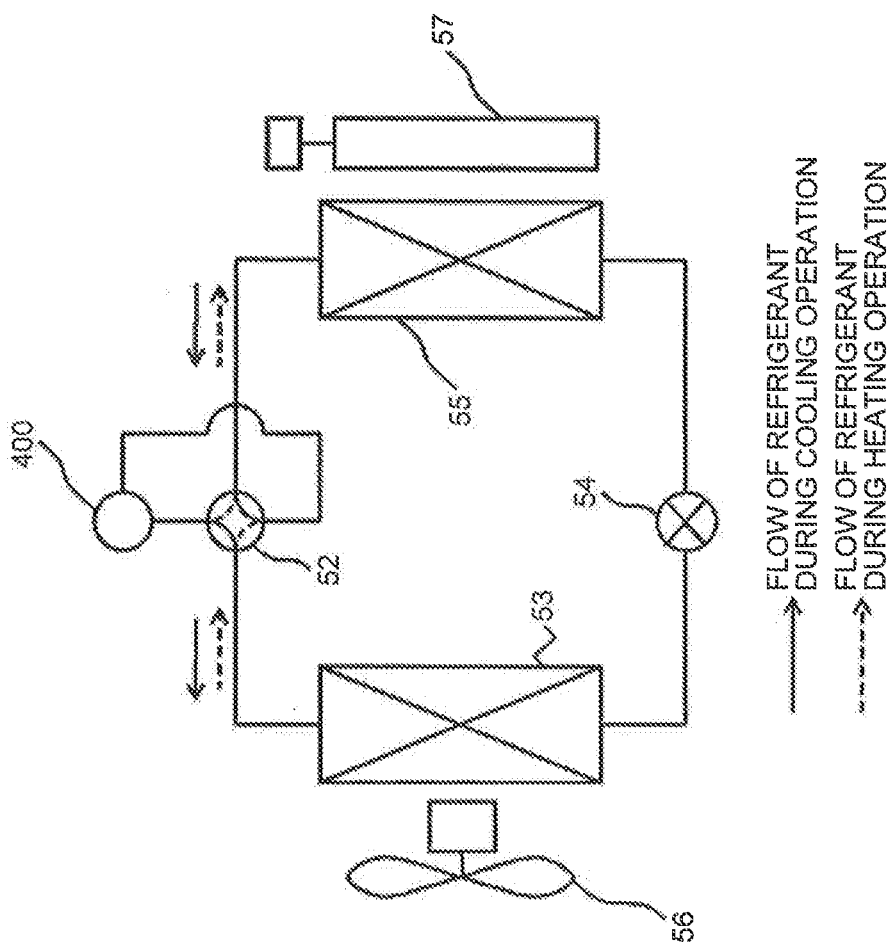
FIG. 19 depicts the first embodiment, and is a refrigerant circuit diagram of an air conditioner.
Figure 20:
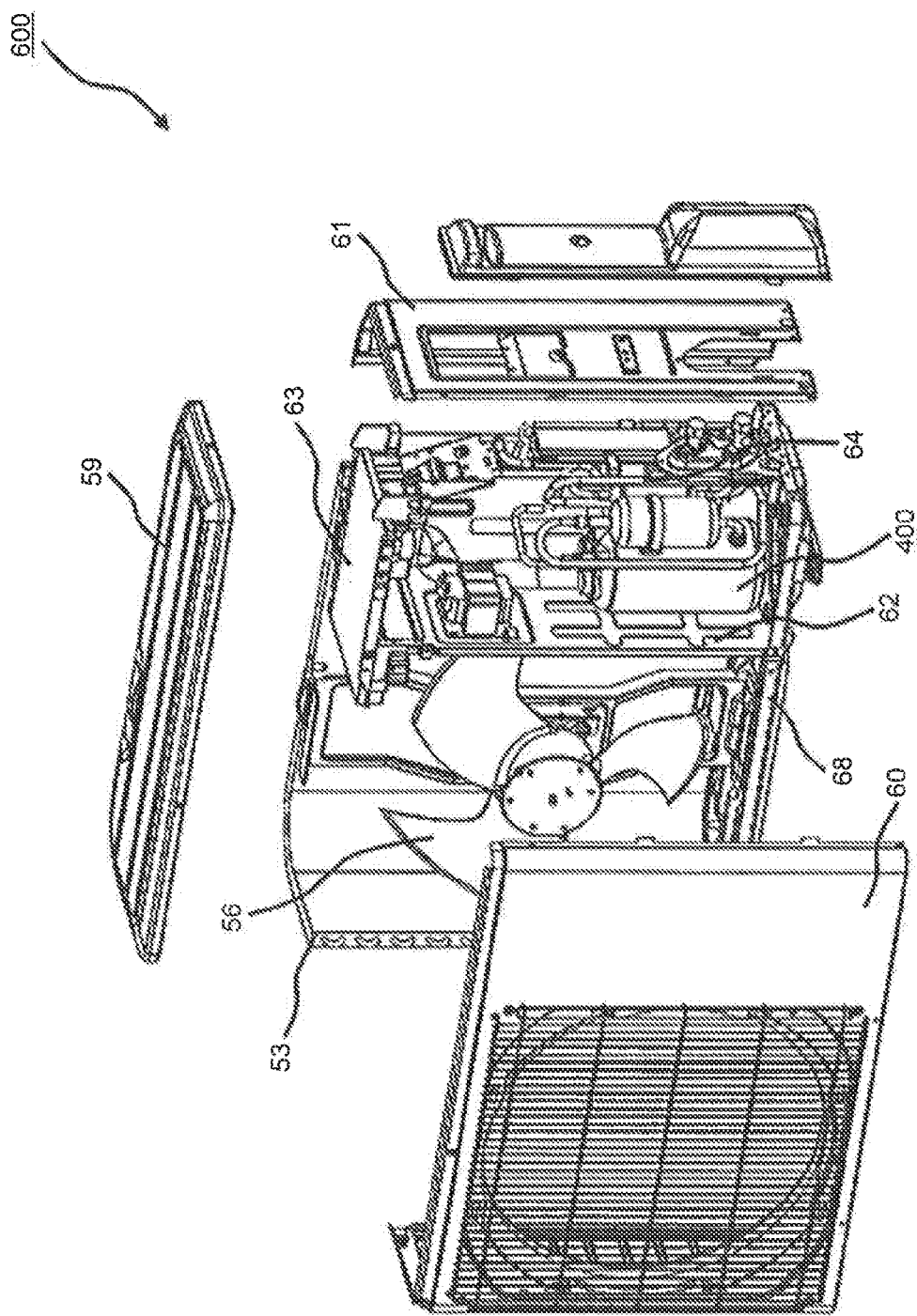
FIG. 20 depicts the first embodiment, and is an exploded perspective view of an outdoor unit 600 of the air conditioner.

FIGS. 19 and 20 depict the first embodiment, where FIG. 19 is a refrigerant circuit diagram of the air conditioner, and FIG. 20 is an exploded perspective view of an outdoor unit 600 of the air conditioner.

As shown in FIG. 19, the refrigerant circuit of the air conditioner constitutes the refrigerating cycle by sequentially connecting the two-cylinder rotary compressor 400 that compresses a refrigerant, a four-way valve 52 switching refrigerant flow directions between a cooling operation and a heating operation, an outdoor heat exchanger 53 that operates as a condenser during the cooling operation and as an evaporator during the heating operation, a decompression device 54 (an electronically controlled expansion valve) that decompresses a high-pressure liquid refrigerant into a low-pressure gas-liquid two-phase refrigerant, and an indoor heat exchanger 55 that operates as an evaporator during the cooling operation and as a condenser during the heating operation.

A solid arrow in FIG. 19 indicates a direction in which the refrigerant flows during the cooling operation. A dashed arrow in FIG. 19 indicates a direction in which the refrigerant flows during the heating operation.

An outdoor air blower 56 is provided on the outdoor heat exchanger 53, and an indoor air blower 57 (a cross flow fan) is provided on the indoor heat exchanger 55.

During the cooling operation, a compressed high-temperature and high-pressure refrigerant is discharged from the two-cylinder rotary compressor 400 and is put into the outdoor heat exchanger 53 via the four-way valve 52. In this outdoor heat exchanger 53, outside air blown by the outdoor air blower 56 provided on an air course of the outdoor heat exchanger 53 exchanges heat with the refrigerant while passing through between a fin and a tube (a heat exchange tube) of the outdoor heat exchanger 53, the refrigerant is cooled into a high-pressure liquefied state, and the outdoor heat exchanger 53 functions as the condenser. Thereafter, the liquefied refrigerant passes through the decompression device 54, where the refrigerant is decompressed into the low-pressure gas-liquid two-phase refrigerant, and the low-pressure gas-liquid two-phase refrigerant flows into the indoor heat exchanger 55. In the indoor heat exchanger 55, the indoor air blower 57 (a cross flow fan) attached on an air course of the indoor heat exchanger 55 drives indoor air to pass through between a fin and a tube (a heat exchange tube) of the indoor heat exchanger 55 and to exchange heat with the refrigerant, thereby cooling the air blown into an indoor space. On the other hand, the refrigerant receives the heat from the air and evaporates into a gaseous state (the indoor heat exchanger 55 functions as the evaporator), and the refrigerant then returns to the two-cylinder rotary compressor 400.

During the heating operation, the four-way valve 52 is reversed, whereby the refrigerant flows in a direction opposite to that of the flow of the refrigerant during the cooling operation in the refrigerating cycle, the indoor heat exchanger 55 functions as the condenser, and the outdoor heat exchanger 53 functions as the evaporator. The air heated by the indoor heat exchanger 55 controls (cools) the indoor space.

A configuration of the outdoor unit 600 of the air conditioner is described with reference to FIG. 20. The outdoor unit 600 of the air conditioner is configured to include the outdoor heat exchanger 53 having a generally L-shape in a plan view, a base plate 68 (a base) constituting a bottom of a housing of the outdoor unit 600, a flat top panel 59 constituting a top surface of the housing, a front panel 60 having a generally L-shape in a plan view and constituting a front surface and one side portion of the housing, a side panel 61 constituting the other side portion of the housing, a separator 62 separating the air course (an air blower chamber) from a machine chamber, an electric component box 63 in which electric components are contained, the two-cycle rotary compressor 400 that compresses the refrigerant, refrigerant-pipe/refrigerant-circuit components 64 for forming the refrigerant circuit, the outdoor air blower 56 blowing the air to the outdoor heat exchanger 53, and the like.

By incorporating the two-cylinder rotary compressor 400 according to the present embodiment and the outdoor air blower 56 (an air blower) using the induction motor 100 according to the present embodiment as a motor in the outdoor unit 600 of the air conditioner configured as described above, it becomes possible to improve the efficiency of the air conditioner.

The invention claimed is:

1. A rotor of an induction motor, the rotor comprising:
a squirrel-cage secondary conductor formed by filling a rotor slot of a rotor iron core with a nonmagnetic and conductive material,
wherein the rotor iron core is produced by stacking a predetermined number of magnetic steel sheets in an axial direction,
wherein the motor slot is constituted by
an outer circumference slot, formed near an outer circumference of the rotor, that gradually broadens from its uneven end nearest to the outer circumference of the rotor to its end farthest away from the outer circumference of the rotor and
an internal circumference slot having a curved end without a concave portion farthest away from the outer circumference of the rotor, formed inside of the outer circumferential slot, that communicates with the outer circumferential slot at the end of the outer circumferential slot farthest away from the outer circumference of the rotor,
wherein a circumferential width TC of an innermost circumference of the outer circumferential slot is smaller than a circumferential width TD of an outermost circumference of the inner circumferential slot, and
wherein a circumferential width of the outer circumferential slot becomes smaller as the outer circumferential slot approaches to the outer circumference of the rotor.

2. The rotor of an induction motor according to claim 1, wherein
the circumferential width TC of the innermost circumference of the outer circumferential slot satisfies a relation of $1.5 \times T \leq TC$ with respect to a thickness T of the magnetic steel sheet that constitutes the rotor iron core.

3. The rotor of an induction motor according to claim 1, wherein
when it is assumed that a shortest distance between a center side of the inner circumferential slot and the outer circumference of the rotor is TB, and that a shortest distance between an end side of the inner circumferential slot and the outer circumference of the rotor is TE, the TB and the TE satisfy a relation of $1.0 \text{ mm} \leq TB \leq 2.5 \text{ mm}$ and $1.0 \text{ mm} \leq TE \leq 2.5 \text{ mm}$, respectively.

4. The rotor of an induction motor according to claim 1, wherein
when it is assumed that a shortest distance between a center side of the inner circumferential slot and the outer circumference of the rotor is TB, and that a shortest distance between an end side of the inner circumferential slot and the outer circumference of the rotor is TE, the TB and the TE satisfy a relation of $TB \leq TE$.

5. The rotor of an induction motor according to claim 1, wherein
when it is assumed that a shortest distance between the outer circumferential slot and the outer circumference of the rotor is TA, the TA is set to be smaller than a thickness T of the magnetic steel sheet that constitutes the rotor iron core.

6. An induction motor comprising the rotor of an induction motor according to claim 1.

7. A compressor comprising the induction motor according to claim 6.

8. An air conditioner comprising the compressor according to claim 7.

9. An air blower comprising the induction motor according to claim 6.

10. An air conditioner comprising the air blower according to claim 9.

* * * * *